US009539987B2

(12) United States Patent
Polocoser et al.

(10) Patent No.: US 9,539,987 B2
(45) Date of Patent: Jan. 10, 2017

(54) WIPER ADAPTER AND WIPER ASSEMBLY INCORPORATING THE SAME

(71) Applicant: TRICO PRODUCTS CORPORATION, Rochester Hills, MI (US)

(72) Inventors: Mitica Polocoser, Wayne, MI (US); Kyle Moll, Oxford, MI (US)

(73) Assignee: Trico Products Corporation, Rochester Hills, MI (US)

(*) Notice: Subject to any disclaimer, the term of this patent is extended or adjusted under 35 U.S.C. 154(b) by 288 days.

(21) Appl. No.: 14/231,907

(22) Filed: Apr. 1, 2014

(65) Prior Publication Data

US 2015/0274132 A1    Oct. 1, 2015

(51) Int. Cl.
*B60S 1/38* (2006.01)
*B60S 1/40* (2006.01)

(52) U.S. Cl.
CPC .............. *B60S 1/4048* (2013.01); *B60S 1/381* (2013.01); *B60S 1/3879* (2013.01); *B60S 1/3886* (2013.01); *B60S 2001/4051* (2013.01)

(58) Field of Classification Search
CPC .................. B60S 1/4045; B60S 1/4048; B60S 2001/4051; B60S 2001/4054; B60S 1/4038; B60S 1/4041; B60S 2001/4058; B60S 2001/4061; B60S 1/4064
USPC ...................................... 15/250.32
See application file for complete search history.

(56) References Cited

U.S. PATENT DOCUMENTS 2,589,339 A   3/1952   Carson
2,616,112 A   11/1952  Smulski
2,643,411 A   6/1953   Nesson
2,746,077 A   5/1956   Higgins
2,760,220 A   8/1956   Deibel
2,766,474 A   10/1956  Horton
2,799,887 A   7/1957   Nemic
(Continued)

FOREIGN PATENT DOCUMENTS

DE    1028896 B    4/1958
DE    1247161 B    8/1967
(Continued)

OTHER PUBLICATIONS

International Search Report and Written Opinion of the International Searching Authority mailed Jun. 30, 2015 in PCT International Application No. PCT/US2015/023543.

*Primary Examiner* — Monica Carter
*Assistant Examiner* — Andrew A Horton
(74) *Attorney, Agent, or Firm* — Miller Canfield

(57) ABSTRACT

The present invention relates to an adapter for use in releasably attaching a windshield wiper assembly to a wiper arm having an attachment member including a track defined by a base and walls depending therefrom, a bent tab extending outwardly from the base, and fins that extend from the walls. The wiper adapter includes a body having first and second ends, a pair of opposing sidewalls extending longitudinally therebetween and having an inside and outside surface each, a nose connecting the sidewalls at the first end for receiving the bent tab of the wiper arm, a strap connecting the sidewalls for engaging the base of the wiper arm, and at least one resilient locking tab disposed adjacent to the second end and extending from at least one of the inside surfaces of the sidewalls for engaging at least one of the fins of the wiper arm.

32 Claims, 11 Drawing Sheets

(56) References Cited

U.S. PATENT DOCUMENTS

| | | |
|---|---|---|
| 2,801,436 A | 8/1957 | Scinta |
| 2,814,820 A | 12/1957 | Elliott et al. |
| 2,932,843 A | 4/1960 | Zaiger et al. |
| 2,937,393 A | 5/1960 | Brueder |
| 2,946,078 A | 7/1960 | Deibel et al. |
| 2,974,341 A | 3/1961 | Hart |
| 3,029,460 A | 4/1962 | Hoyler |
| 3,037,233 A | 6/1962 | Peras et al. |
| 3,056,991 A | 10/1962 | Smithers |
| 3,060,480 A | 10/1962 | Ziegler |
| 3,082,464 A | 3/1963 | Smithers |
| 3,088,155 A | 5/1963 | Smithers |
| 3,089,174 A | 5/1963 | Bignon |
| 3,089,175 A | 5/1963 | Hinder |
| 3,092,867 A | 6/1963 | Ziegler |
| 3,094,734 A | 6/1963 | Hoyler |
| 3,104,412 A | 9/1963 | Hinder |
| 3,116,509 A | 1/1964 | Contant et al. |
| 3,132,367 A | 5/1964 | Wise |
| 3,140,501 A | 7/1964 | Macpherson |
| 3,147,507 A | 9/1964 | Glynn |
| 3,179,969 A | 4/1965 | Glynn |
| 3,192,551 A | 7/1965 | Appel |
| 3,233,273 A | 2/1966 | Anderson |
| 3,234,578 A | 2/1966 | Golub et al. |
| 3,296,647 A | 1/1967 | Gumbleton |
| 3,317,945 A | 5/1967 | Ludwig |
| 3,317,946 A | 5/1967 | Anderson |
| 3,350,738 A | 11/1967 | Anderson |
| 3,378,874 A | 4/1968 | Scinta |
| D211,570 S | 7/1968 | Tomlin |
| 3,418,679 A | 12/1968 | Barth et al. |
| 3,480,986 A | 12/1969 | Forster |
| 3,588,942 A | 6/1971 | Schlesinger |
| 3,618,155 A | 11/1971 | Mower |
| 3,641,614 A | 2/1972 | Newsome |
| 3,665,544 A | 5/1972 | Sakamoto |
| 3,667,083 A | 6/1972 | Linker |
| 3,673,631 A | 7/1972 | Yamadai et al. |
| 3,685,086 A | 8/1972 | Froehlich |
| 3,751,754 A | 8/1973 | Quinlan et al. |
| 3,780,395 A | 12/1973 | Quinlan et al. |
| 3,798,703 A | 3/1974 | Den Berg et al. |
| 3,845,519 A | 11/1974 | Quinlan et al. |
| 3,862,465 A | 1/1975 | Ito |
| 3,872,537 A | 3/1975 | Bianchi |
| 3,879,793 A | 4/1975 | Schlegel |
| 3,881,214 A | 5/1975 | Palu |
| 4,028,770 A | 6/1977 | Appel |
| 4,063,328 A | 12/1977 | Arman |
| 4,083,642 A | 4/1978 | Journee |
| 4,102,003 A | 7/1978 | Hancu |
| 4,127,916 A | 12/1978 | van den Berg et al. |
| 4,132,490 A | 1/1979 | Journee |
| 4,158,513 A | 6/1979 | Journee |
| 4,224,001 A | 9/1980 | Arndt et al. |
| 4,300,259 A | 11/1981 | Maiocco |
| 4,309,790 A | 1/1982 | Bauer et al. |
| 4,339,839 A | 7/1982 | Knights |
| 4,343,063 A | 8/1982 | Batt |
| D267,939 S | 2/1983 | Duvoux |
| D268,020 S | 2/1983 | Duvoux |
| 4,400,845 A | 8/1983 | Noguchi et al. |
| 4,416,032 A | 11/1983 | Mohnach et al. |
| 4,422,207 A | 12/1983 | Maiocco et al. |
| 4,438,543 A | 3/1984 | Noguchi et al. |
| 4,464,808 A | 8/1984 | Berry |
| 4,547,925 A | 10/1985 | Blackborow et al. |
| 4,561,143 A | 12/1985 | Beneteau |
| 4,570,284 A | 2/1986 | Verton |
| 4,587,686 A | 5/1986 | Thompson |
| 4,590,638 A | 5/1986 | Beneteau |
| 4,741,071 A | 5/1988 | Bauer et al. |
| 4,766,636 A | 8/1988 | Shinpo |
| 4,782,547 A | 11/1988 | Mohnach |
| 4,807,326 A | 2/1989 | Arai et al. |
| 4,852,206 A | 8/1989 | Fisher |
| D307,408 S | 4/1990 | Mower et al. |
| D308,660 S | 6/1990 | Fisher |
| D308,845 S | 6/1990 | Charet et al. |
| 4,976,001 A | 12/1990 | Wright |
| 4,980,944 A | 1/1991 | Longman |
| 4,984,325 A | 1/1991 | Arai et al. |
| 4,989,290 A | 2/1991 | Hoshino |
| 5,042,106 A | 8/1991 | Maubray |
| 5,056,183 A | 10/1991 | Haney, III |
| 5,062,176 A | 11/1991 | Unterborn et al. |
| 5,084,933 A | 2/1992 | Buechele |
| 5,086,534 A | 2/1992 | Journee |
| 5,093,954 A | 3/1992 | Kuzuno |
| 5,123,140 A | 6/1992 | Raymond |
| 5,138,739 A | 8/1992 | Maubray |
| 5,168,596 A | 12/1992 | Maubray |
| 5,168,597 A | 12/1992 | Schon et al. |
| 5,170,527 A | 12/1992 | Lyon, II |
| 5,179,761 A | 1/1993 | Buechele et al. |
| 5,206,969 A | 5/1993 | Patterson et al. |
| 5,218,735 A | 6/1993 | Maubray |
| 5,228,167 A | 7/1993 | Yang |
| 5,233,721 A | 8/1993 | Yang |
| 5,257,436 A | 11/1993 | Yang |
| 5,276,937 A | 1/1994 | Lan |
| 5,283,925 A | 2/1994 | Maubray |
| 5,307,536 A | 5/1994 | Lescher |
| 5,311,636 A | 5/1994 | Lee |
| 5,319,826 A | 6/1994 | Mower |
| 5,325,564 A | 7/1994 | Swanepoel |
| 5,332,328 A | 7/1994 | Yang |
| 5,383,249 A | 1/1995 | Yang |
| 5,392,487 A | 2/1995 | Yang |
| 5,392,489 A | 2/1995 | Mohnach |
| 5,412,834 A | 5/1995 | Burkard et al. |
| 5,454,135 A | 10/1995 | Okuya et al. |
| 5,463,790 A | 11/1995 | Chiou et al. |
| 5,485,650 A | 1/1996 | Swanepoel |
| 5,509,166 A | 4/1996 | Wagner et al. |
| 5,553,962 A | 9/1996 | Eustache |
| 5,606,765 A | 3/1997 | Ding |
| 5,611,103 A | 3/1997 | Lee |
| 5,618,124 A | 4/1997 | Chen |
| 5,632,059 A | 5/1997 | Lee |
| 5,724,700 A | 3/1998 | Marks |
| 5,807,016 A | 9/1998 | Herring et al. |
| 5,885,023 A | 3/1999 | Witek et al. |
| 5,937,474 A | 8/1999 | Hussaini |
| 5,946,764 A | 9/1999 | Tworzydlo |
| 5,956,801 A | 9/1999 | Jeffer et al. |
| 6,000,093 A | 12/1999 | Charng |
| 6,004,659 A | 12/1999 | Leutsch et al. |
| 6,158,078 A | 12/2000 | Kotlarski |
| 6,161,248 A | 12/2000 | Merkel et al. |
| 6,161,249 A | 12/2000 | Hussaini |
| 6,163,922 A | 12/2000 | Fisher et al. |
| 6,185,805 B1 | 2/2001 | Rosiere et al. |
| 6,195,833 B1 | 3/2001 | Geilenkirchen et al. |
| 6,279,191 B1 | 8/2001 | Kotlarski et al. |
| 6,292,974 B1 | 9/2001 | Merkel et al. |
| 6,332,236 B1 | 12/2001 | Ku |
| 6,353,962 B1 | 3/2002 | Matsumoto et al. |
| 6,434,780 B1 | 8/2002 | Kotlarski |
| 6,523,218 B1 | 2/2003 | Kotlarski |
| 6,550,096 B1 | 4/2003 | Stewart et al. |
| 6,553,607 B1 | 4/2003 | De Block |
| 6,581,237 B1 | 6/2003 | Kotlarski |
| 6,591,445 B2 | 7/2003 | Nacamuli |
| 6,599,051 B1 | 7/2003 | Jarasson |
| 6,611,988 B1 | 9/2003 | De Block |
| 6,625,842 B1 | 9/2003 | De Block |
| 6,634,056 B1 | 10/2003 | De Block |
| 6,654,983 B1 | 12/2003 | Raynaud |
| 6,665,905 B2 | 12/2003 | Wegner et al. |
| 6,668,419 B1 | 12/2003 | Kotlarski |
| 6,671,922 B1 | 1/2004 | Geilenkirchen et al. |
| 6,675,433 B1 | 1/2004 | Stewart et al. |

(56) References Cited

U.S. PATENT DOCUMENTS

| | | |
|---|---|---|
| 6,675,434 B1 | 1/2004 | Wilhelm et al. |
| 6,687,948 B2 | 2/2004 | Kotlarski |
| 6,779,223 B1 | 8/2004 | Roekens |
| 6,789,289 B2 | 9/2004 | Roodt |
| 6,792,644 B2 | 9/2004 | Roodt |
| 6,810,556 B1 | 11/2004 | Kotlarski |
| 6,836,924 B2 | 1/2005 | Egan-Walter |
| 6,836,926 B1 | 1/2005 | De Block |
| 6,886,213 B2 | 5/2005 | Merkel et al. |
| 6,910,244 B2 | 6/2005 | De Block et al. |
| 6,944,905 B2 | 9/2005 | De Block et al. |
| 6,966,096 B2 | 11/2005 | Bascotto et al. |
| 7,028,368 B2 | 4/2006 | Lee et al. |
| 7,055,207 B2 | 6/2006 | Coughlin |
| 7,150,066 B1 | 12/2006 | Huang |
| 7,207,082 B2 | 4/2007 | Lee |
| 7,228,588 B2 | 6/2007 | Kraemer et al. |
| 7,281,294 B2 | 10/2007 | Wilms et al. |
| 7,350,259 B2 | 4/2008 | Walworth et al. |
| 7,451,520 B2 | 11/2008 | Weiler et al. |
| 7,523,522 B2 | 4/2009 | Herring et al. |
| 7,543,353 B2 | 6/2009 | Ko |
| 7,546,660 B2 | 6/2009 | Heinrich et al. |
| 7,559,110 B1 | 7/2009 | Kotlarski et al. |
| 7,581,279 B2 | 9/2009 | Baseotto et al. |
| 7,621,016 B2 | 11/2009 | Verelst et al. |
| 7,992,248 B2 | 8/2011 | Koppen et al. |
| 8,020,246 B2 | 9/2011 | Bauer et al. |
| 8,122,560 B2 | 2/2012 | Ku |
| 8,191,200 B2 | 6/2012 | Kim |
| 8,191,201 B2 | 6/2012 | De Block et al. |
| 8,220,106 B2 * | 7/2012 | Fink .................. B60S 1/38 15/250.32 |
| 2001/0004783 A1 | 6/2001 | Kotlarski |
| 2003/0009842 A1 | 1/2003 | Egner-Walter |
| 2004/0111820 A1 | 6/2004 | Aoyama et al. |
| 2004/0181894 A1 | 9/2004 | Lee et al. |
| 2004/0250369 A1 | 12/2004 | Matsumoto et al. |
| 2006/0021178 A1 * | 2/2006 | Verelst .................. B60S 1/38 15/250.32 |
| 2006/0130263 A1 | 6/2006 | Coughlin |
| 2006/0207050 A1 | 9/2006 | Shanmugham et al. |
| 2007/0174989 A1 | 8/2007 | Moll et al. |
| 2007/0180643 A1 | 8/2007 | Kim |
| 2008/0196192 A1 | 8/2008 | Yao |
| 2008/0295272 A1 | 12/2008 | Jarasson |
| 2009/0089956 A1 | 4/2009 | De Block et al. |
| 2009/0199357 A1 | 8/2009 | Thienard |
| 2010/0154159 A1 | 6/2010 | Baque |
| 2010/0186185 A1 | 7/2010 | Grasso et al. |
| 2010/0236008 A1 | 9/2010 | Yang et al. |
| 2010/0281645 A1 | 11/2010 | Kim et al. |
| 2011/0047742 A1 | 3/2011 | Kim et al. |
| 2011/0162162 A1 | 7/2011 | Fujiwara et al. |
| 2011/0277265 A1 | 11/2011 | Ehde |
| 2012/0060316 A1 | 3/2012 | Avasiloaie et al. |
| 2012/0110773 A1 | 5/2012 | Thielen et al. |
| 2012/0159733 A1 | 6/2012 | Kwon |
| 2012/0222231 A1 * | 9/2012 | Ku .................. B60S 1/4087 15/250.32 |

FOREIGN PATENT DOCUMENTS

| | | |
|---|---|---|
| DE | 1505397 A1 | 10/1969 |
| DE | 1655410 A1 | 8/1971 |
| DE | 2311293 A1 | 9/1974 |
| DE | 2336271 A1 | 2/1975 |
| DE | 2350302 A1 | 4/1975 |
| DE | 2353368 A1 | 5/1975 |
| DE | 2640399 A1 | 3/1977 |
| DE | 33 39 414 A1 | 5/1985 |
| DE | 19729865 A1 | 1/1999 |
| DE | 19734843 A1 | 2/1999 |
| DE | 19814609 A1 | 10/1999 |
| DE | 10335393 A1 | 9/2004 |
| EP | 0 007 017 A1 | 6/1979 |
| EP | 0354279 A1 | 2/1990 |
| EP | 0422921 A1 | 4/1991 |
| EP | 0465095 A1 | 1/1992 |
| EP | 0594451 A1 | 4/1994 |
| FR | 1069875 A | 2/1954 |
| FR | 2377302 A1 | 8/1978 |
| FR | 2515121 A1 | 4/1983 |
| GB | 878951 A | 10/1961 |
| GB | 1012902 A | 12/1965 |
| GB | 1489791 | 4/1975 |
| GB | 1395918 A | 5/1975 |
| GB | 2308542 A | 7/1997 |
| JP | 2007-331748 A | 12/2007 |
| KR | 1020110034994 A | 4/2011 |
| WO | 0021809 A1 | 4/2000 |
| WO | 02087935 A1 | 11/2002 |
| WO | 03051696 A1 | 6/2003 |
| WO | 03080409 A1 | 10/2003 |
| WO | 2004048163 A1 | 6/2004 |
| WO | 2004076251 A1 | 9/2004 |
| WO | 2004076252 A1 | 9/2004 |
| WO | 2006069648 A1 | 7/2006 |
| WO | 2009133979 A1 | 11/2009 |
| WO | 2011131395 A2 | 10/2011 |

* cited by examiner

WIPER ADAPTER AND WIPER ASSEMBLY INCORPORATING THE SAME

BACKGROUND OF THE INVENTION

1. Field of the Invention

The present invention relates generally to wiper assemblies for wiper systems, and more specifically, to wiper adapters for wiper assemblies.

2. Description of the Related Art

Conventional automotive wiper systems known in the art include some type of wiper assembly (sometimes referred to as a wiper blade) mounted to a wiper arm which, in turn, is mounted adjacent to a surface to be wiped, such as a windshield of a vehicle, and pivotally driven to impart reciprocal motion to the wiper assembly across the windshield. The wiper assembly typically includes a rubber wiping element that contacts the windshield across the surface to be wiped. The wiper assembly often incorporates one or more metal strips that act to reinforce the wiping element and facilitate wiping contact by the wiping element across what is typically a curved glass surface. The wiper assembly also typically includes a coupler that attaches to and supports the one or more metal strips, and an adapter attached to the coupler. The adapter allows the wiper assembly to be releasably attached to the wiper arm. In this context, the wiper arm delivers a downward force to the wiper assembly that is distributed thereacross, pressing the wiper assembly into contact with the windshield. The wiper assembly may also include additional components, such as an airfoil and a pair of end caps located at distal ends of the wiper assembly.

Each of the components of a wiper assembly of the type described above must cooperate to effectively clean a surface to be wiped. In addition, each of the components must be designed not only to facilitate an improved wipe quality, but also so as to simplify the process of manufacturing the wiper assembly. Further, each of the components must cooperate to provide a wiper assembly that can be releasably attached to the wiper arm in a simple way and, at the same time, provide a reliable connection. While the wiper systems known in the related art have generally performed well for their intended purpose, there remains a need in the art for a wiper system that has superior operational characteristics, reduces the cost of manufacturing the assembly, and provides simple and releasable attachment with reliable retention between the wiper assembly and the arm.

SUMMARY OF THE INVENTION

The present invention overcomes the disadvantages in the related art in an adapter for use in releasably attaching a wiper assembly to a wiper arm having an attachment member. The attachment member has a track defined by a base and walls depending therefrom, a bent tab extending outwardly from the base, and fins that extend from the walls. The adapter has a body with a first end and a second end, with a pair of opposing sidewalls extending longitudinally between the ends. Each of the sidewalls has an inside surface and an outside surface. The adapter also has a nose connecting the sidewalls at the first end, for receiving the bent tab of the attachment member of the wiper arm. The adapter has a strap connecting the sidewalls, for engaging the base of the attachment member of the wiper arm. The adapter also has at least one resilient locking tab disposed adjacent to the second end, which extends from at least one of the inside surfaces of the sidewalls, for engaging at least one of the fins of the attachment member of the wiper arm.

In addition, the present invention is a wiper assembly. The wiper assembly includes a wiping element adapted to contact the surface to be wiped, at least one elongated spline acting to support the wiping element, a coupler operatively attached to the spline, and an adapter pivotally attached to the coupler. The adapter is used to releasably attach the wiper assembly to a wiper arm having an attachment member. The attachment member has a track defined by a base and walls depending therefrom, a bent tab extending outwardly from the base, and fins that extend from the walls. The adapter has a body with a first end and a second end, with a pair of opposing sidewalls extending longitudinally between the ends. Each of the sidewalls has an inside surface and an outside surface. The adapter also has a nose connecting the sidewalls at the first end, for receiving the bent tab of the attachment member of the wiper arm. The adapter has a strap connecting the sidewalls, for engaging the base of the attachment member of the wiper arm. The adapter also has at least one resilient locking tab disposed adjacent to the second end, which extends from at least one of the inside surfaces of the sidewalls, for engaging at least one of the fins of the attachment member of the wiper arm.

In this way, the adapter of the present invention attaches the wiper assembly to the wiper arm. The adapter of the present invention improves retention between the wiper assembly and the wiper arm and, at the same time, provides simple, reliable, releasable attachment therebetween. Further, the adapter of the present invention provides advantages related to manufacturing and component assembly.

BRIEF DESCRIPTION OF THE DRAWINGS

Other objects, features, and advantages of the present invention will be readily appreciated as the same becomes better understood after reading the subsequent description taken in connection with the accompanying drawings wherein.

DETAILED DESCRIPTION OF THE EMBODIMENTS OF THE INVENTION

Figure 1:
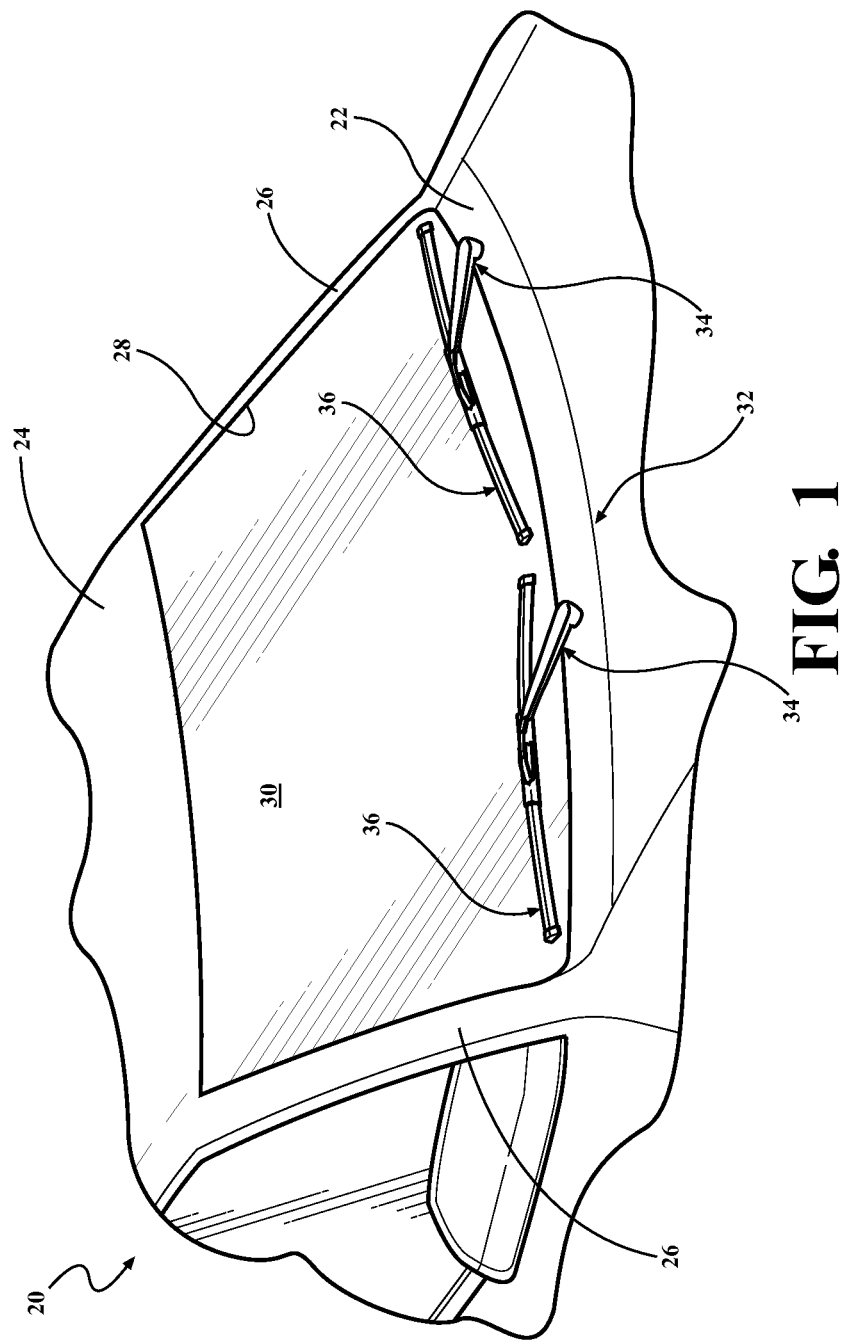
FIG. 1 is a partial perspective view of a front of a vehicle having a pair of wiper assemblies pivotally mounted for reciprocal movement across a windshield of the vehicle.

With reference to the Figures, where like numerals are used to designate like structure throughout the several views, a portion of a vehicle is schematically illustrated at 20 in FIG. 1. The vehicle 20 includes a cowl 22, a roof 24, and a pair of laterally spaced front A-pillars 26 extending between the roof 24 and the cowl 22. The A-pillars 26, roof 24, and cowl 22 cooperate to define a generally rectangular opening 28 in which is supported a curved or "swept back" glass windshield 30. As illustrated, the vehicle 20 is an automobile, but may be any type of vehicle, such as heavy-duty trucks, trains, airplanes, ships, construction vehicles and equipment, military vehicles, or any other type of vehicle that contains surface wiper systems.

A wiper system is generally indicated at 32 in FIG. 1 and is employed to clean the windshield 30. The wiper system 32 includes a pair of wiper arms, generally indicated at 34, and a pair of generic wiper assemblies, generally indicated at 36, which correspond to the driver and passenger sides of the vehicle 20. However, those having ordinary skill in the art will appreciate that the wiper system 32 could employ a single wiper arm 34 and single wiper assembly 36, or more than two wiper arms 34 and more than two wiper assemblies 36 without departing from the scope of the present invention.

In the representative example illustrated herein, each wiper assembly 36 is carried by a corresponding wiper arm 34. The wiper system 32 also includes an electrical motor (not shown, but generally known in the art) to move the wiper assemblies 36 in an oscillating manner across the surface of the windshield 30.

While the wiper assembly 36 illustrated in FIG. 1 is shown in connection with the front windshield 30 of the vehicle 20, those having ordinary skill in the art will appreciate that wiper assemblies 36 may be employed in other areas of the vehicle 20 that employ a wiper system 32, such as a rear window (not shown) or a head lamp (not shown). Thus, it will be understood that the present invention is not limited for use solely in connection with wiper arms 34 adapted for use on a vehicle's windshield 30, but for use in all applications where wiper systems 32 are employed.

Figure 2:
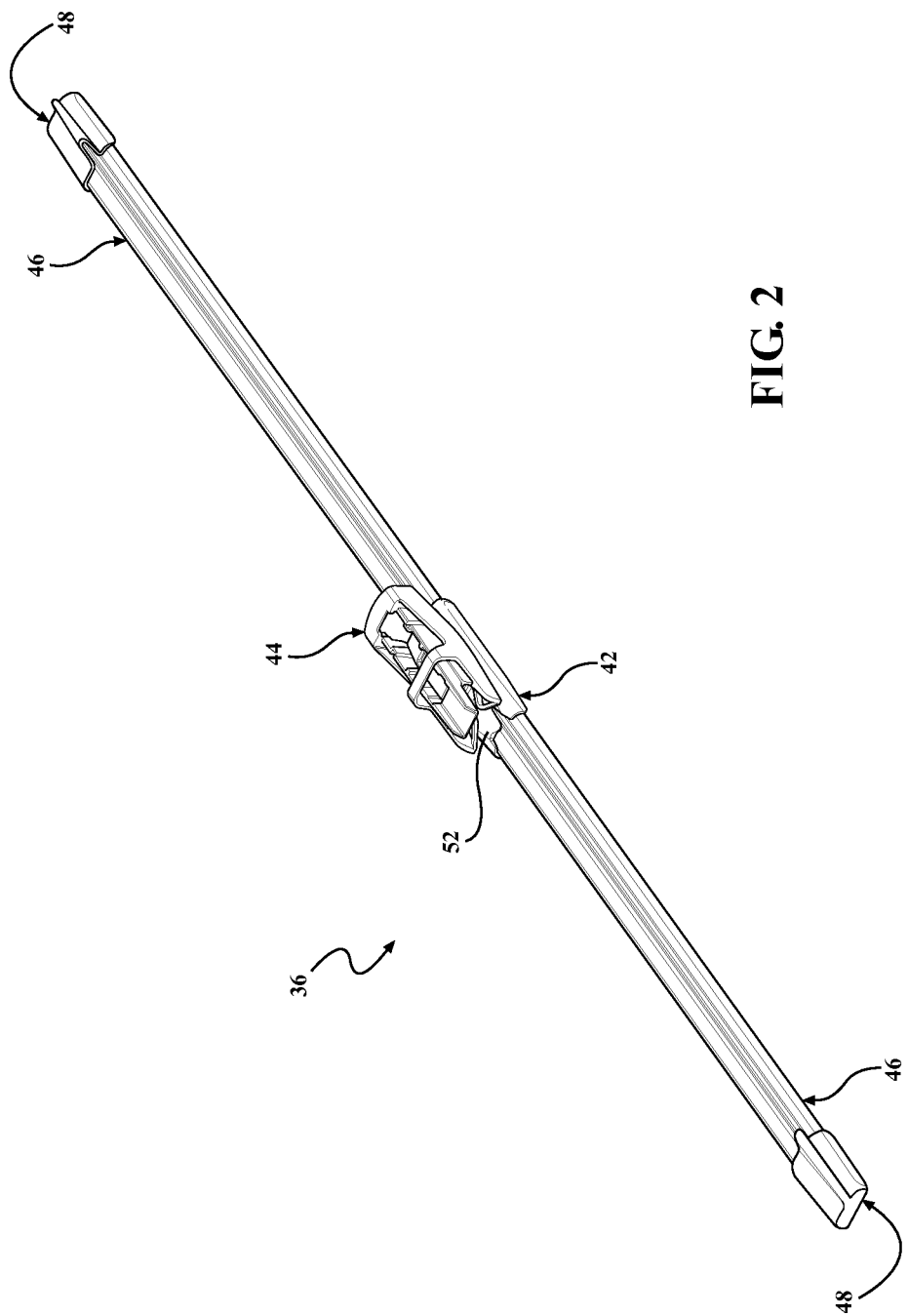
FIG. 2 is an enlarged perspective view of a wiper assembly according to one embodiment of the present invention.
Figure 3:
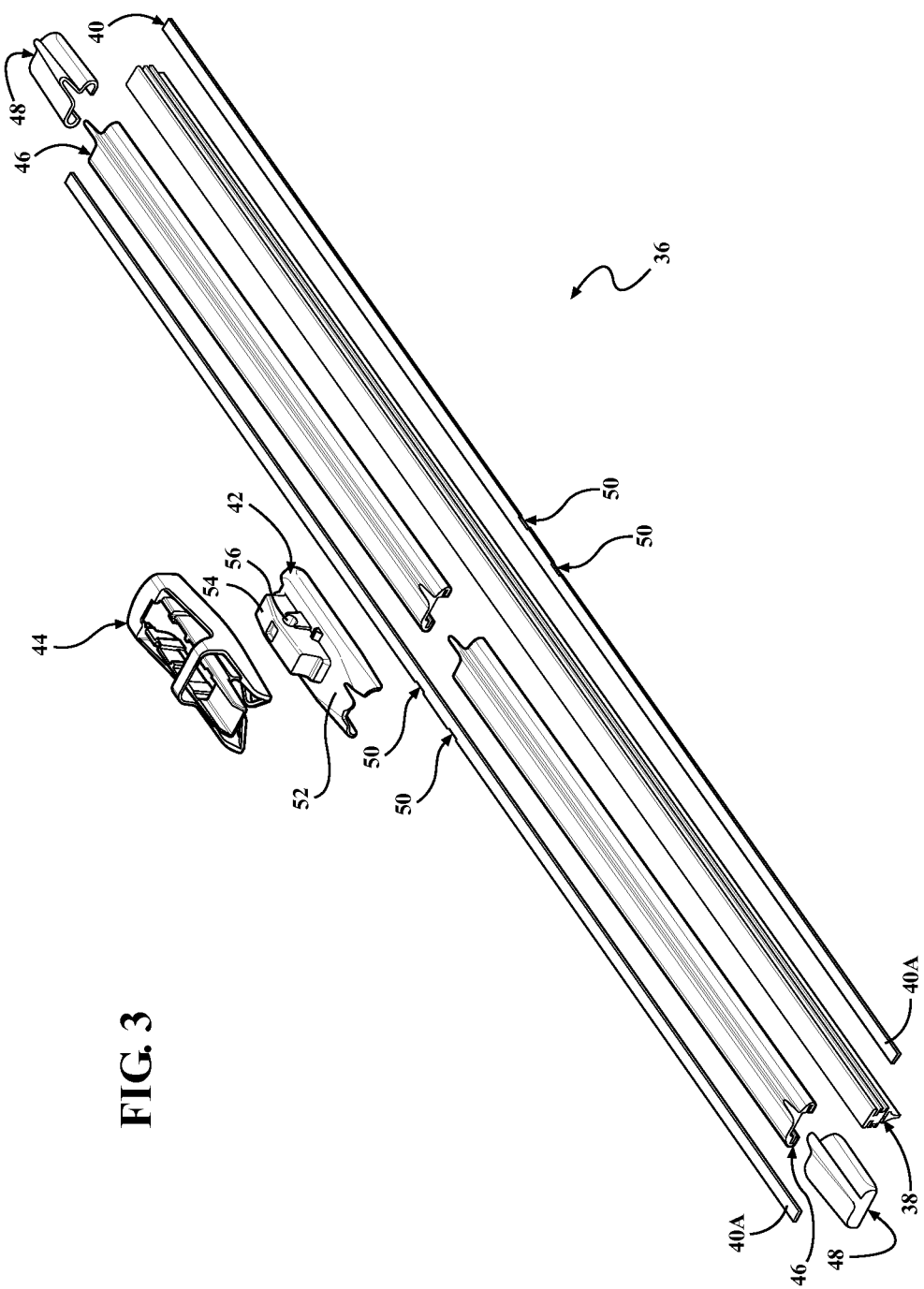
FIG. 3 is an exploded perspective view of the wiper assembly, according to one embodiment of the present invention, of FIG. 2.

Referring to FIGS. 2 and 3, the wiper assembly 36 includes a wiping element 38 that is adapted to contact a surface of the vehicle 20 to be wiped, in this representative example, the windshield 30. The wiper assembly 36 also includes at least one support member 40 that defines a longitudinal axis and that acts to reinforce or support the wiping element 38. In the representative embodiment illustrated herein, the support member 40 is a pair of splines 40A that operatively reinforce or support the wiping element 38. However, those having ordinary skill in the art will appreciate from the description that follows that the support member 40 may be either monolithic or defined by a pair of splines 40A. The wiper assembly 36 also includes a coupler 42 operatively attached to the support member 40. As is described in detail below, the coupler 42 is configured to attach to an adapter 44 which, in turn, is adapted to connect to the wiper arm 34. The wiper assembly 36 may also include an airfoil assembly, generally indicated at 46, to prevent the wiper assembly 36 from lifting away from the surface of the windshield 30. The wiper assembly 36 may still further include one or more end caps, generally indicated at 48, to prevent the airfoil assembly 36 from disengaging the support member 40. Each of the above components will be described in greater detail below.

The wiping element 38 is configured to a predetermined length corresponding to a particular application, and is often manufactured through an extrusion process which enables the length of the wiping element 38 to be easily adjusted without a substantial increase in manufacturing expense. Furthermore, while the wiping element 38 utilized in one embodiment of the present invention is constructed from a flexible rubber, those having ordinary skill in the art will appreciate that it may be constructed from any flexible material, such as silicone or another polymer, without departing from the scope of the present invention.

In the embodiment illustrated herein, the wiping element 38 has opposing grooves (not shown in detail, but generally known in the art) extending laterally therein and longitudinally therealong between the longitudinal ends of the wiping element 38. The grooves receive the splines 40A of the support member 40. This configuration is referred to in the art as a "twin rail" beam blade. However, those having ordinary skill in the art will appreciate that the support member 40 could be operatively attached to the wiping element 38 in other ways, such as by gluing, without departing from the scope of the present invention.

The support member 40 may be constructed from a resiliently flexible material, such as spring steel or a polymer, and is adapted to apply force from an intermediate position between its longitudinal ends. More specifically, the support member 40 receives force from the spring loaded wiper arm 34 at an intermediate position and distributes this force across the span of the support member 40 toward its longitudinal ends. To that end, the support member 40 may be curved longitudinally with a predetermined radius of curvature. In the related art, this predetermined radius of curvature is sometimes referred to as a "free form" radius of curvature. Accordingly, the curvature of the support member 40 may be symmetrical or asymmetrical, depending on the force requirements of the application and the contour of the windshield 30. The flexible, free form, pre-curved support member 40 straightens out when the wiper arm 34 applies a force thereto to flatten the support member 40, and directs the wiping element 38 to contact the windshield 30. Thus, the elongated support member 40 includes a free-form curvature that ensures force distribution on windshields having various curvatures and that effects proper wrapping about the windshield 30.

As illustrated in FIG. 3, the splines 40A of the support member 40 may have a substantially constant width and a constant thickness throughout the length between the longitudinal ends of the support member 40. The constant width and thickness are adapted to provide high lateral and torsional stiffness so as to avoid lateral and torsional deflections, which cause the wiping element 38 to stick/slip ("chatter") on the windshield 30 during operation. Thus, the cross-section of the support member 40 has a generally rectangular outer profile that makes the support member 40 easier to manufacture. More specifically, where the support member 40 is constructed from metal, such as spring steel, the tools and machinery used to manufacture the support member 40 are less complicated than that required to manufacture one having varying widths and/or thickness.

Furthermore, where the support member 40 is constructed from a polymer, such as a thermoplastic elastomer, the tools and extrusion process machinery are also less complicated than those employed to manufacture varying widths and/or thicknesses. However, those having ordinary skill in the art will appreciate that the support member 40 illustrated herein may include a varying thickness and/or width without departing from the scope of the present invention. Further, as mentioned above, those having ordinary skill in the art will appreciate that the support member 40 could be monolithic or a plurality of splines 40A.

The support member 40 may include one or more notches (not shown, but generally known in the art) located near the longitudinal ends of the splines 40A of the support member 40, that are generally trapezoidal or rectangular in shape, but may be any shape suitable to cooperate with the end caps 48 to retain the end caps 48 to the support member 40. Additionally, the support member 40 may include one or more securing features 50 for cooperating with the coupler 42 to operatively attach the support member 40 to the coupler 42. In the embodiment illustrated in FIG. 3, the securing features 50 are formed as a plurality of rectangular notches that cooperate with the coupler 42 to secure the splines 40A of the support member 40 to the coupler 42. However, those having ordinary skill in the art will appreciate that the securing features 50 could be of any suitable shape or configuration, or be omitted entirely, without departing from the scope of the present invention. Specifically, those having ordinary skill in the art will appreciate that the coupler 42 could be fixed to the support member 40 in several different ways. By way of non-limiting example, the coupler 42 could be glued, welded, crimped, bolted, riveted, formed-over, locked, or otherwise fixed to the support member 40, without departing from the scope of the present invention As discussed above, in one embodiment, the wiper assembly 36 may include an airfoil assembly 46 operatively mounted to the support member 40. The airfoil assembly 46 extends along the length of the wiping element 38 and the support member 40 and acts to reduce the likelihood of wind lift by allowing air to flow over the wiper assembly 36. More specifically, and in the embodiment illustrated herein, the airfoil assembly 46 is formed as two individual components operatively mounted to the support member 40 with the coupler 42 extending therebetween. However, those having ordinary skill in the art will appreciate that the airfoil assembly 46 could be defined by a single unitary component, or be omitted entirely, without departing from the scope of the present invention.

As illustrated in FIGS. 2 and 3, the wiper assembly 36 may include a pair of end caps, generally indicated at 48. The end caps 48 are adapted to be disposed adjacent to the distal ends of the support member 40. The end caps 48 are secured to the support member 40 and may have a profile that substantially mimics the contours of the airfoil assembly 46 to maintain the wind lift characteristics of the wiper assembly 36 and to provide an increased aesthetic value. The end caps 48 also provide a mass increase adjacent to the distal ends of the support member 40 that helps prevent localized chatter along the extremities of the wiping element 38 caused by a combination of wind lift and a decrease in the force distributed to this area from the wiper arm 34 via the splines 40A, as described above. It should be appreciated that the end caps 48 may include a locking arm (not shown, but generally known in the art) or other features that engage notches (not shown) in the splines 40A of the support member 40 so as to secure the end caps 48 thereto.

As previously noted, in one embodiment of the present invention, the wiper assembly 36 includes a coupler 42 operatively attached to the support member 40. As illustrated in FIG. 3, the coupler 42 includes a base portion 52 and a saddle 54 extending therefrom. The saddle 54 includes opposing cylindrical recesses 56 configured to pivotally engage the adapter 44, as is discussed more thoroughly below. However, those having ordinary skill in the art will appreciate that the coupler 42 could be connected to the adapter 44 in any suitable way without departing from the scope of the present invention. In the embodiment illustrated herein, the coupler 42 is a unitary, one piece component. However, those having ordinary skill in the art will appreciate that the coupler 42 could be designed as a plurality of components that interlock or otherwise cooperate to operatively attach to the support member 40, without departing from the scope of the present invention. The coupler 42 of one embodiment of the present invention is constructed from plastic and is formed using an injection molding process. However, those having ordinary skill in the art will appreciate that the coupler 42 could be constructed from any suitable material formed using any suitable process without departing from the scope of the present invention.

Figure 7:
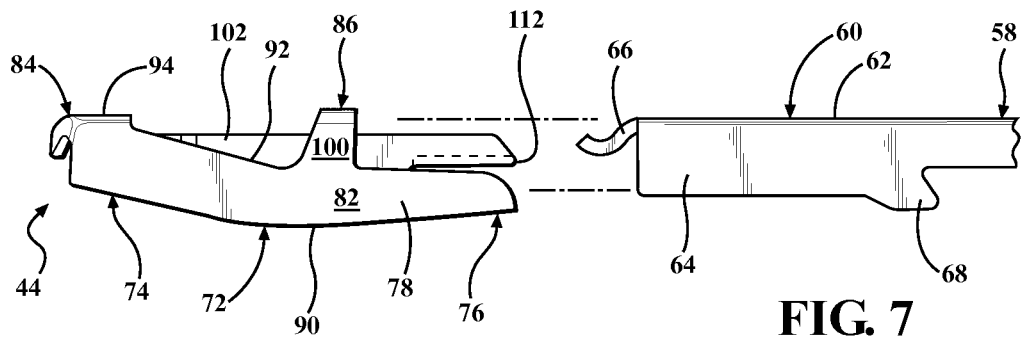
FIG. 7 is as an enlarged partial left side view of the adapter of FIG. 4 and a wiper arm attachment member aligned with the adapter in a pre-assembled position.
Figure 8:
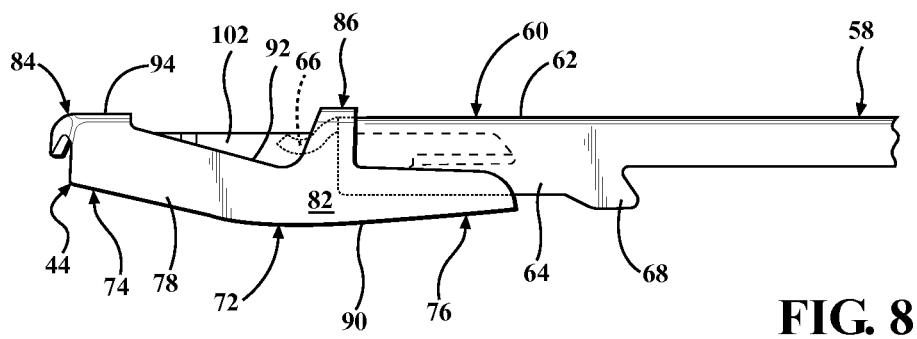
FIG. 8 is an enlarged partial left side view of the adapter and wiper arm of FIG. 7 in a partially-assembled position.
Figure 9:
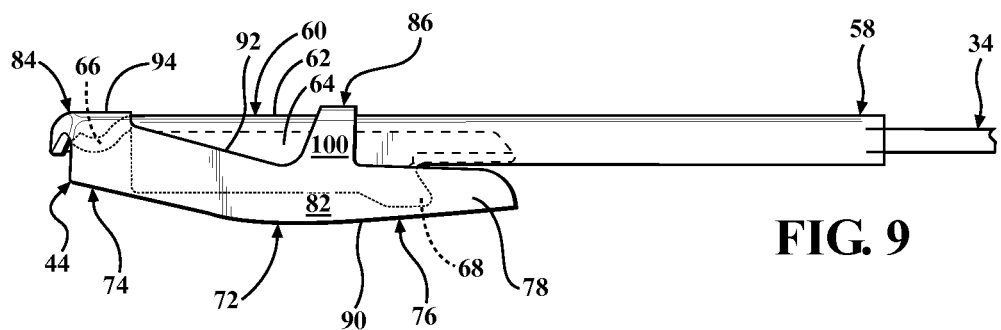
FIG. 9 is an enlarged partial left side view of the adapter and wiper arm of FIG. 7 in a fully-assembled position.
Figure 10:
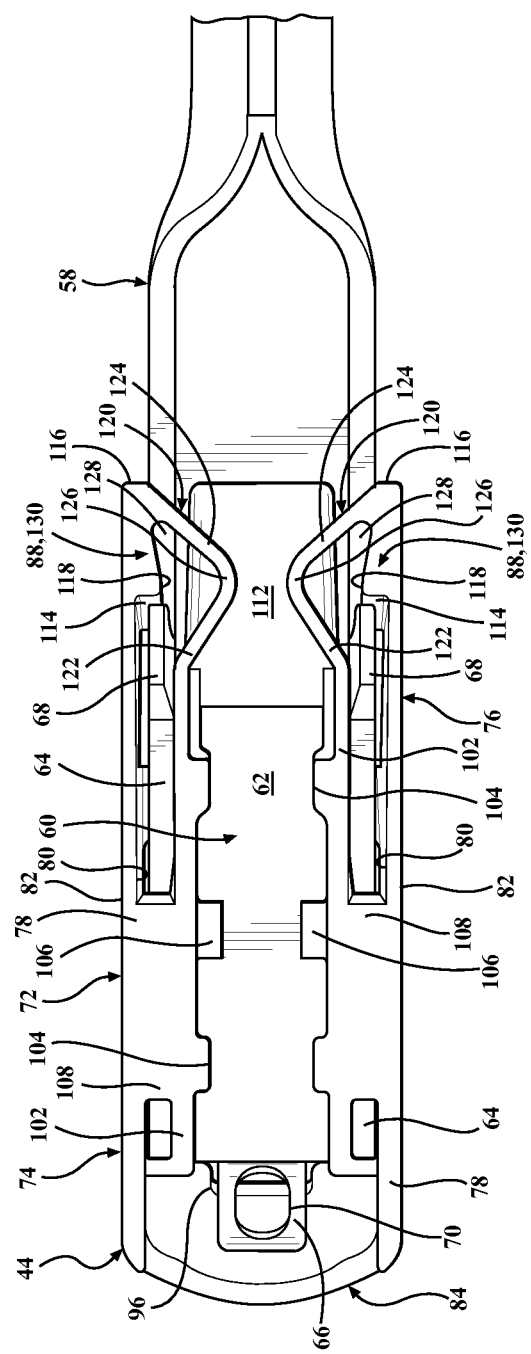
FIG. 10 is an enlarged partial bottom view of the adapter and wiper arm of FIG. 9.

Referring now to FIGS. 7-9, the adapter 44 of the present invention is configured to releasably attach to the wiper arm 34. Specifically, the adapter 44 releasably attaches the wiper assembly 36 to a wiper arm 34 having a specific attachment member 58, which is described more thoroughly below. As illustrated, the attachment member 58 is formed separately from the wiper arm 34 and then operatively attached thereto. However, those having ordinary skill in the art will appreciate that the attachment member 58 could be formed integrally with the wiper arm 34 without departing from the scope of the present invention. The attachment member 58 includes a track, generally indicated at 60, that is defined by a base 62 and a pair of walls 64 depending therefrom. The attachment member 58 also includes a bent tab 66 extending outwardly from the base 62, and a pair of fins 68 (sometimes referred to in the art as "rear locking tabs" or "rear locks") that extend from the walls 64. The bent tab 66 may further include an aperture 70 (see FIGS. 10-13). Those having ordinary skill in the art will appreciate that the attachment member 58 described herein is typically referred to in the art as a "pinch tab" arm. In addition, those having ordinary skill in the art will appreciate from the discussion that follows that the wiper arm 34 and attachment member 58 described above form no part of the present invention.

As shown in FIGS. 4-13, the adapter 44 of the present invention includes a body, generally indicated at 72, that has a first end 74 and a second end 76. The adapter 44 also includes a pair of opposing sidewalls 78 that extend longitudinally between the first end 74 and the second end 76. The sidewalls 78 each have an inside surface 80 and an outside surface 82. The adapter 44 further includes a nose 84 connecting the sidewalls 78 at the first end 74 of the body 72. The adapter 44 also includes a strap, generally indicated at 86, connecting the sidewalls 78. The adapter 44 still further includes at least one resilient locking tab, generally indicated at 88, disposed adjacent to the second end 76 of the body 72 and extending from at least one of the inside surfaces 80 of the sidewalls 78. Each of the above components will be described in greater detail below.

Figure 4:
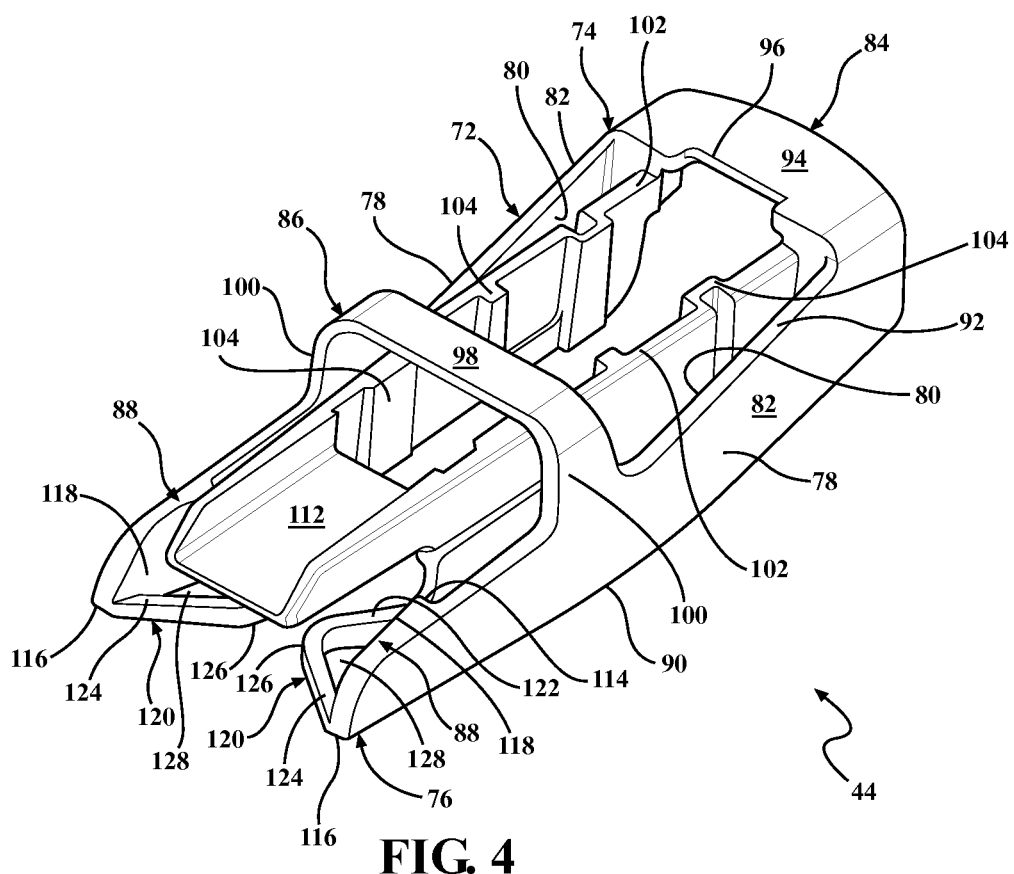
FIG. 4 is an enlarged perspective view of an adapter, according to one embodiment of the present invention, of the wiper assembly of FIGS. 2 and 3.

As best shown in FIGS. 4 and 7, the sidewalls 78 have a generally arcuate lower edge 90 extending longitudinally between the first end 74 and second end 76 of the body 72 of the adapter 44. Further, as is discussed in greater detail below, the sidewalls 78 have an upper edge 92 spaced from the lower edge 90 that merges seamlessly with the nose 84 and strap 86. However, those having ordinary skill in the art will appreciate that the lower edge 90 and the upper edge 92 of the sidewalls 78 could have any suitable shape or configuration without departing from the scope of the present invention.

Figure 11:
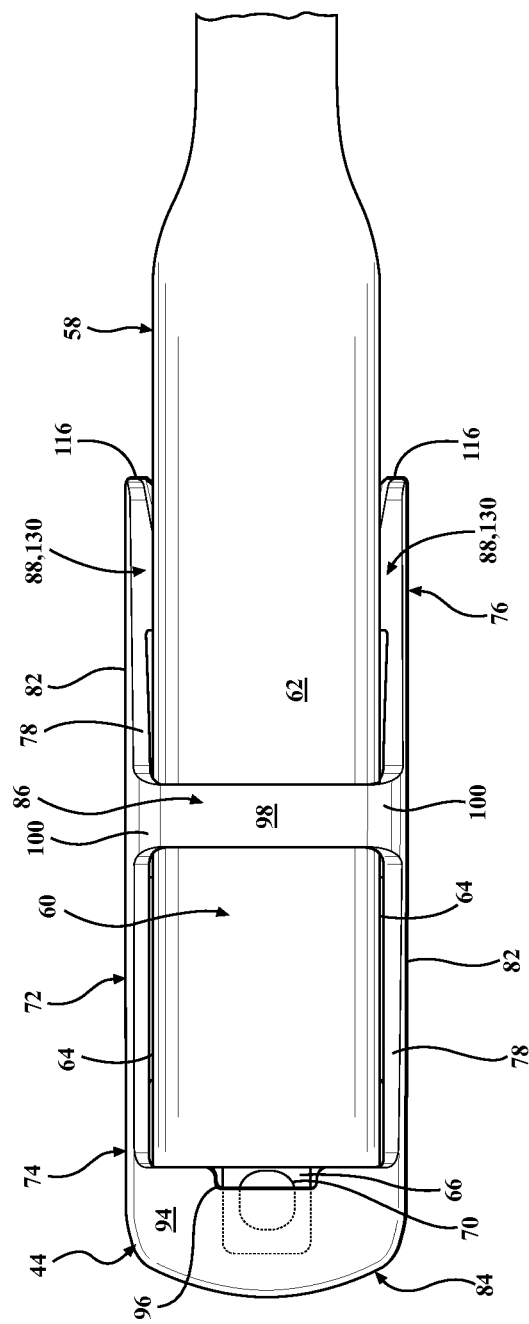
FIG. 11 is an enlarged partial top view of the adapter and wiper arm of FIG. 9.

As best shown in FIG. 11, the nose 84 is configured to receive the bent tab 66 of the attachment member 58 of the wiper arm 34. In one embodiment, the nose 84 has an upper surface 94 that extends between and merges with the sidewalls 78. The upper surface 94 has a rectangular notch 96 disposed therein. The notch 96 is adapted to receive at least a portion of the bent tab 66 of the attachment member 58 of the wiper arm 34 when the attachment member 58 is attached to the adapter 44. However, those having ordinary skill in the art will appreciate that the nose 84 could be configured to receive the bent tab 66 of the attachment member 58 of the wiper arm 34 in other ways, such as by utilizing different geometry and/or by omitting the notch 96, without departing from the scope of the present invention.

Figure 5:
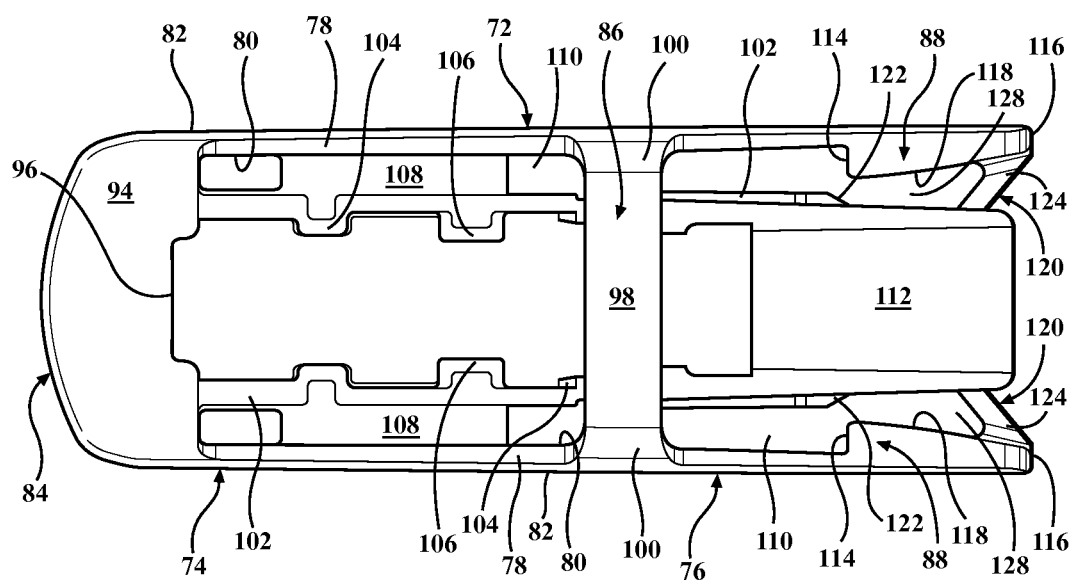
FIG. 5 is an enlarged top view of the adapter of FIG. 4.

Referring to FIGS. 4, 5, and 7, the strap 86 is configured to engage the base 62 of the attachment member 58 of the wiper arm 34. In one embodiment, the strap 86 is spaced longitudinally along the body 72 of the adapter 44 such that it is between the nose 84 and the at least one locking tab 88. As illustrated, the strap 86 has a middle section 98 and a pair of supports 100 depending therefrom. The supports 100 have a tapered profile and merge the middle section 98 of the strap 86 with the outside surfaces 82 of the sidewalls 78. Those having ordinary skill in the art will appreciate that the middle section 98 and the supports 100 of the strap 86 could have any suitable shape, size, or configuration sufficient to engage the base 62 of the attachment member 58 of the wiper arm 34, without departing from the scope of the present invention. Further, as best illustrated by FIG. 7, the middle section 98 of the strap 86 is spaced vertically above the nose 84. However, those having ordinary skill in the art will appreciate that the strap 86 and nose 84 could be spaced or configured differently without departing from the scope of the present invention.

Figure 6:
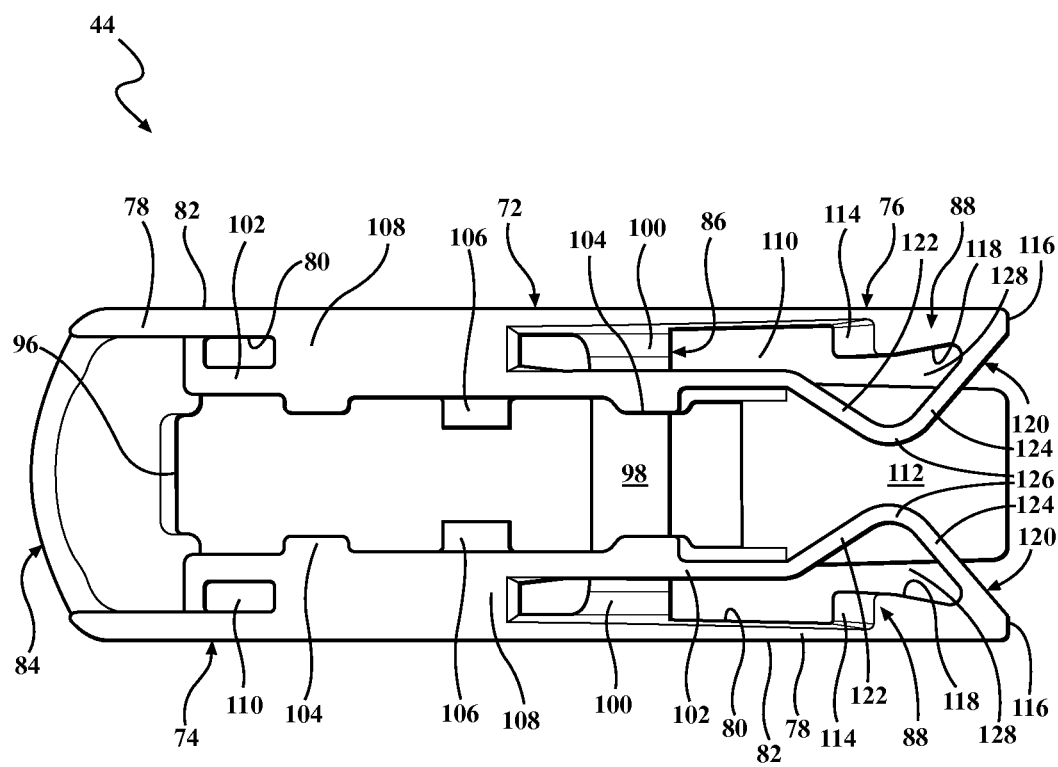
FIG. 6 is an enlarged bottom view of the adapter of FIG. 4.

Referring to FIGS. 4-6, in one embodiment, the adapter 44 includes a pair of rails 102 spaced inwardly from the inside surfaces 80 of the sidewalls 78. The rails 102 extend longitudinally within the body 72 of the adapter 44 for a predetermined longitudinal extent of the body 72. Specifically, the rails 102 extend under the strap 86. As shown best by FIG. 4, the rails 102 extend to and merge with the nose 84. However, those having ordinary skill in the art will appreciate that the rails 102 could extend to different longitudinal positions without departing from the scope of the present invention. The rails 102 have a generally rectangular profile and include friction pads 104 formed therein. The friction pads 104 cooperate with the saddle 54 of the coupler 42 so as to provide a slight interference between the coupler 42 and the adapter 44 to dampen rotation therebetween, which helps eliminate chatter of the wiping element 38 on the windshield 30 during operation. In the embodiment illustrated throughout the figures, the friction pads 104 are formed as a plurality of indents and protrusions spaced along the rails 102. However, those having ordinary skill in the art will appreciate that the friction pads 104 could be configured differently, have different geometry, or be omitted partially or entirely without departing from the scope of the present invention. Further, as shown best by FIG. 10, the rails 102 have cylindrical protrusions 106 extending into the body 72 of the adapter 44 toward each other. The cylindrical protrusions 106 of the adapter 44 are configured to cooperate with the cylindrical recesses 56 of the coupler 42 (discussed above) to provide a pivoting connection between the adapter 44 and the coupler 42. However, it should be appreciated that the adapter 44 and coupler 42 could be pivotally coupled in different ways. By way of non-limiting example, the geometry could be inverted such that the adapter 44 could have recesses and the coupler 42 could have protrusions. Thus, those having ordinary skill in the art will appreciate that the coupler 42 could be connected to the adapter 44 in any suitable way without departing from the scope of the present invention.

As shown best in FIGS. 5 and 6, in one embodiment, the adapter 44 includes a pair of shelves 108. The shelves 108 connect the inside surfaces 80 of the sidewalls 78 to the rails 102. The shelves 108 extend longitudinally within the body 72 of the adapter 44 for a predetermined longitudinal extent of the body 72. The shelves 108 are spaced vertically below the strap 86 so as to receive the track 60 of the attachment member 58 of the wiper arm 34. Further, in one embodiment, as shown best in FIGS. 5 and 6, the inside surfaces 80 of the sidewalls 78 cooperate with the rails 102 to define a pair of channels 110 therebetween. The channels 110 are configured to receive the walls 64 of the track 60 of the attachment member 58 of the wiper arm 34.

Referring to FIGS. 4, 5, and 7-9, in one embodiment, the adapter 44 includes an alignment guide 112 extending from the rails 102 along the second end 76 of the body 72. The alignment guide 112 has an upwardly opening U-shaped profile (see FIG. 4). The alignment guide 112 cooperates with the bent tab 66 of the attachment member 58 of the wiper arm 34 such that the walls 64 of the attachment member 58 are aligned with the channels 110 of the adapter 44 during attachment of the wiper arm 34 attachment member 58 with the adapter 44.

As best shown in FIGS. 4-6, 10, and 11, the adapter 44 includes at least one resilient locking tab 88 configured to engage at least one of the fins 68 of the attachment member 58 of the wiper arm 34. As shown throughout the figures, the locking tab 88 extends from the inside surface 80 of at least one of the sidewalls 78 of the adapter 44 at least partially into one of the channels 110 of the adapter 44.

In the embodiment illustrated throughout the figures, the adapter 44 includes a pair of locking tabs 88, with each of the locking tabs 88 disposed adjacent to the second end 76 of the body 72 of the adapter 44 and extending from each of the inside surfaces 80 of each respective sidewall 78. However, those having ordinary skill in the art will appreciate that the adapter 44 of the present invention could include any suitable number of locking tabs 88 disposed adjacent to the second end 76 of the body 72 of the adapter 44, without departing from the scope of the present invention. As best shown in FIGS. 4 and 5, in one embodiment, the locking tabs 88 are integrated with the sidewalls 78 such that the sidewalls 78 are at least partially resilient along the second end 76 of the body 72 of the adapter 44. Specifically, the locking tabs 88 each have a shoulder 114 for engaging the fins 68 of the attachment member 58 of the wiper arm 34, a distal end 116 spaced from the shoulder 114, and a tapered wall 118 extending between the shoulder 114 and the distal end 116. As shown best in FIG. 5, in the illustrated embodiment, the shoulders 114 extend from each of the inside surfaces 80 of the sidewalls 80. Further, the distal ends 116 merge the outside surfaces 82 of the sidewalls 78 with each of the tapered walls 118 of the locking tabs 88. It will be appreciated that the tapered wall 118 eases installation of the attachment member 58 of the wiper arm 34 to the adapter 44, whereby the locking tabs 88 can be displaced outwardly when the tapered wall 118 contacts the track 60 of the attachment member 58 of the wiper arm 34, and whereby the locking tabs 88 resiliently return once installation with the adapter 44 is complete, thereby engaging the fins 68 of the attachment member 58 of the wiper arm 34 so as to secure the attachment member 58 to the adapter 44. While the locking tabs 88 illustrated throughout the figures include a shoulder 114, distal end 116, and tapered wall 118 as described above, those having ordinary skill in the art will appreciate that the adapter 44 of the present invention could utilize any number of locking tabs 88 of any suitable configuration, size, or shape, disposed adjacent to the second end 76 of the body 72 of the adapter 44 and configured to engage at least one of the fins 68 of the attachment member 58 of the wiper arm 34, without departing from the scope of the present invention.

Referring to FIGS. 5, 6, and 10-14, in one embodiment, the adapter 44 includes a pair of resilient links 120 extending between the locking tabs 88 and the rails 102. The links 120 each have a first leg 122 extending from the distal end 116 of a locking tab 88, a second leg 124 extending from the rail 102 adjacent to the respective locking tab 88, and an apex 126 connecting the first leg 122 to the second leg 124. The first leg 122, second leg 124, and apex 126 cooperate to define a retention pocket 128 for accommodating the fins 68 of the attachment member 58 of the wiper arm 34 in the event that the shoulders 114 of the locking tabs 88 disengage from the same. In one embodiment, the retention pocket 128 has a substantially triangular profile. Those having ordinary skill in the art will appreciate that the links 120 act as a safety mechanism so as to prevent the wiper assembly 36 from becoming completely disconnected from the wiper arm 34 in operation, in the event that the locking tabs 88 fail due to weakness or cracking, which can be caused by improper installation of the wiper assembly 36 to the wiper arm 34. Further, those having ordinary skill in the art will appreciate that the links 120 could have any size, shape, or configuration extending between the rails 102 and locking tabs 88 suitable to accommodate the fins 68 of the attachment member 58 of the wiper arm 34 in the event the locking tabs 88 disengage from the same, without departing from the scope of the present invention.

Figure 12:
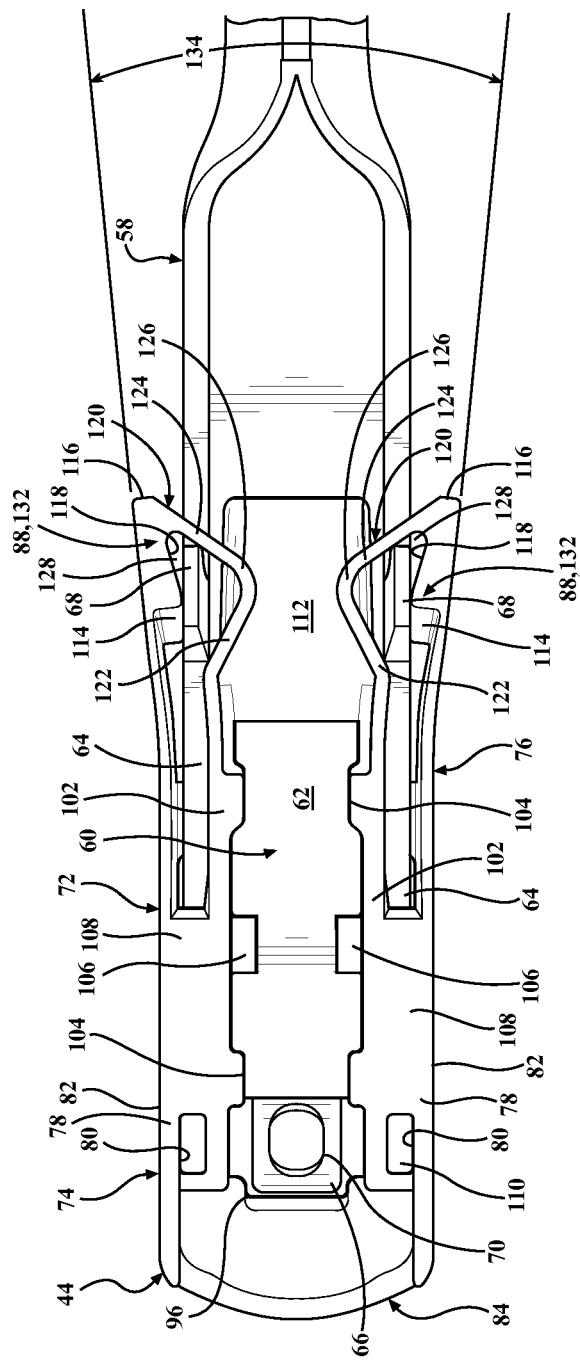
FIG. 12 is an enlarged partial bottom view of the adapter and wiper arm of FIG. 7, according to one embodiment of the present invention, in a partially-disassembled locking position.
Figure 13:
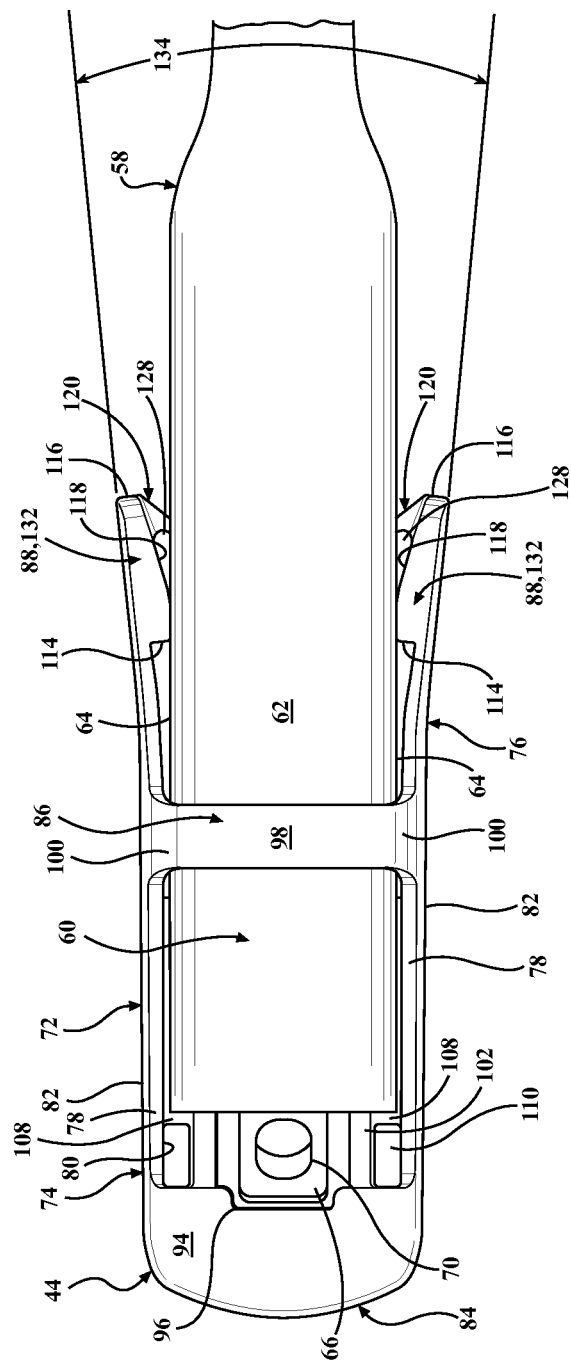
FIG. 13 is an enlarged partial top view of the adapter and wiper arm of FIG. 12.

Referring to FIGS. 10-13, in one embodiment, the locking tabs 88 have a first position 130 (see FIGS. 10 and 11) wherein the locking tabs 88 are substantially parallel with respect to each other. Specifically, the locking tabs 88 are in the first position 130 when the locking tabs 88 engage the fins 68 of the attachment member 58 of the wiper arm 34. Further, the locking tabs 88 have a second position 132 (see FIGS. 12 and 13) wherein the locking tabs 88 define a transverse angle 134 therebetween. The locking tabs 88 are movable from the first position 130 to the second position 132 in response to disengagement from the fins 68 of the attachment member 58 of the wiper arm 34. Further, as shown in FIGS. 12 and 13, the retention pockets 128 of the links 120 capture the fins 68 of the attachment member 58 of the wiper arm 34 when the locking tabs 88 move from the first position 130 to the second position 132.

In this way, the adapter 44 of the present invention attaches the wiper assembly 36 to the wiper arm 34. The adapter 44 of the present invention improves retention between the wiper assembly 36 and wiper arm 34 and, at the same time, provides simple, reliable, releasable attachment. Specifically, those having ordinary skill in the art will appreciate that the adapter 44 of the present invention enables installation with a "pinch tab" style wiper arm 34 attachment member 58 in a parallel fashion (see FIGS. 7-9).

Thus, the wiper arm 34 and adapter 44 do not pivot with respect to each other during installation.

Further, one embodiment of the adapter 44 of the present invention provides an additional safety mechanism in that the links 120 prevent the wiper assembly 36 from becoming completely disconnected from the wiper arm 34 in the event that the locking tabs 88 disconnect from the fins 68 of the attachment member 58 of the wiper arm 34. Specifically, those having ordinary skill in the art will appreciate that the safety mechanism created by the links 120 prevents a wiper assembly 36 from detaching from the vehicle 20 in operation.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. An adapter for use in releasably attaching a wiper assembly to a wiper arm having an attachment member including a track defined by a base and walls depending therefrom, a bent tab extending outwardly from the base, and fins that extend from the walls, said adapter comprising:
   a body having a first end and a second end;
   a pair of opposing sidewalls extending longitudinally between said first end and said second end, each of said sidewalls having an inside surface and an outside surface;
   a nose connecting said sidewalls at said first end for receiving the bent tab of the attachment member of the wiper arm;
   a strap connecting said sidewalls for engaging the base of the attachment member of the wiper arm;
   a pair of rails inwardly spaced from said inside surfaces of said sidewalls and extending longitudinally under said strap for a predetermined longitudinal extent of said body; and
   a pair of locking tabs disposed adjacent to said second end, each of said locking tabs having a shoulder extending from said inside surface of one of said sidewalls for engaging one of the fins of the attachment member of the wiper arm, a distal end spaced from said shoulder, and a tapered wall extending between said shoulder and said distal end, wherein said distal ends of said locking tabs merge each of said outside surfaces of said sidewalls with each of said tapered walls.

2. The adapter as set forth in claim 1, wherein said locking tabs are integrated with said sidewalls such that said sidewalls are at least partially resilient along said second end of said body.

3. The adapter as set forth in claim 1, wherein said adapter further includes a pair of resilient links with each of said links extending between one of said locking tabs and one of said rails.

4. The adapter as set forth in claim 3, wherein said links each have a first leg extending from said distal end of one of said locking tabs, a second leg extending from one of said rails, and an apex connecting said first leg to said second leg.

5. The adapter as set forth in claim 4, wherein said first leg, said second leg, and said apex of each respective link cooperate to define a respective retention pocket for accommodating one of the fins of the attachment member of the wiper arm in the event that said shoulders of said locking tabs disengage from the same.

6. The adapter as set forth in claim 5, wherein said retention pockets of said links each have a substantially triangular profile.

7. The adapter as set forth in claim 5, wherein said locking tabs have a first position wherein said locking tabs are substantially parallel with respect to each other, and a second position wherein said locking tabs define a transverse angle therebetween, said locking tabs being movable from said first position to said second position in response to disengagement from the fins of the attachment member of the wiper arm.

8. The adapter as set forth in claim 7, wherein said retention pockets of said links capture the fins of the attachment member of the wiper arm when said locking tabs move from said first position to said second position.

9. The adapter as set forth in claim 1, wherein said strap is spaced longitudinally between said nose and said locking tabs.

10. The adapter as set forth in claim 1, wherein said strap has a middle section and a pair of supports depending therefrom, said supports merging with said outside surfaces of said sidewalls.

11. The adapter as set forth in claim 10, wherein said middle section of said strap is spaced vertically above said nose.

12. The adapter as set forth in claim 1, wherein said adapter further includes a pair of shelves connecting said inside surfaces of said sidewalls to said rails and extending longitudinally for a predetermined longitudinal extent of said body, said shelves spaced vertically below said strap so as to receive the track of the attachment member of the wiper arm.

13. The adapter as set forth in claim 1, wherein said nose includes an upper surface extending between and merging with said sidewalls and having a notch disposed therein, said notch adapted to receive at least a portion of the bent tab of the attachment member of the wiper arm when the attachment member is attached to said adapter.

14. The adapter as set forth in claim 1, wherein said inside surfaces of said sidewalls and said rails define a pair of channels for receiving the walls of the attachment member of the wiper arm.

15. The adapter as set forth in claim 14, wherein said locking tabs each extend from said inside surface of one of said sidewalls at least partially into one of said channels.

16. The adapter as set forth in claim 15, wherein said adapter further includes an alignment guide extending from said rails and having an upwardly opening U-shaped profile for cooperating with the bent tab of the attachment member of the wiper arm and for aligning the walls of the attachment member of the wiper arm with said channels of said adapter during attachment to the wiper arm.

17. A wiper assembly comprising:
a wiping element adapted to contact the surface to be wiped;
at least one elongated spline acting to support said wiping element;
a coupler operatively attached to said spline; and
an adapter pivotally attached to said coupler for use in releasably attaching to a wiper arm having an attachment member including a track defined by a base and walls depending therefrom, a bent tab extending outwardly from the base, and fins that extend from the walls, said adapter including:
a body having a first end and a second end,
a pair of opposing sidewalls extending longitudinally between said first end and said second end, each of said sidewalls having an inside surface and an outside surface,
a nose connecting said sidewalls at said first end for receiving the bent tab of the attachment member of the wiper arm,
a strap connecting said sidewalls for engaging the base of the attachment member of the wiper arm,
at least one resilient locking tab disposed adjacent to said second end and extending from at least one of said inside surfaces of said sidewalls for engaging at least one of the fins of the attachment member of the wiper arm,
a pair of rails inwardly spaced from said inside surfaces of said sidewalls and extending longitudinally under said strap for a predetermined longitudinal extent of said body, said rails and said inside surfaces of said sidewalls defining a pair of channels for receiving the walls of the attachment member of the wiper arm with said at least one locking tab extending from said inside surface of one of said sidewalls at least partially into one of said channels, and
an alignment guide extending from said rails and having an upwardly opening U-shaped profile for cooperating with the bent tab of the attachment member of the wiper arm and for aligning the walls of the attachment member of the wiper arm with said channels of said adapter during attachment to the wiper arm.

18. The wiper assembly as set forth in claim 17, wherein said adapter includes a pair of locking tabs, with each of said locking tabs disposed adjacent to said second end and extending from said inside surfaces of said sidewalls.

19. The wiper assembly as set forth in claim 18, wherein said locking tabs are integrated with said sidewalls such that said sidewalls are at least partially resilient along said second end of said body.

20. The wiper assembly as set forth in claim 18, wherein said locking tabs each have a shoulder for engaging one of the fins of the attachment member of the wiper arm, a distal end spaced from said shoulder, and a tapered wall extending between said shoulder and said distal end.

21. The wiper assembly as set forth in claim 20, wherein said shoulders of said locking tabs each extend from said inside surface of one of said sidewalls, and said distal ends of said locking tabs merge each of said outside surfaces of said sidewalls with each of said tapered walls of said locking tabs.

22. The wiper assembly as set forth in claim 20, wherein said adapter further includes a pair of resilient links with each of said links extending between one of said locking tabs and one of said rails.

23. The wiper assembly as set forth in claim 22, wherein said links each have a first leg extending from said distal end of one of said locking tabs, a second leg extending from one of said rails, and an apex connecting said first leg to said second leg.

24. The wiper assembly as set forth in claim 23, wherein said first leg, said second leg, and said apex of each respective link cooperate to define a respective retention pocket for accommodating one of the fins of the attachment member of the wiper arm in the event that said shoulders of said locking tabs disengage from the same.

25. The wiper assembly as set forth in claim 24, wherein said retention pockets of said links each have a substantially triangular profile.

26. The wiper assembly as set forth in claim 24, wherein said locking tabs have a first position wherein said locking tabs are substantially parallel with respect to each other, and a second position wherein said locking tabs define a transverse angle therebetween, said locking tabs being movable from said first position to said second position in response to disengagement from the fins of the attachment member of the wiper arm.

27. The wiper assembly as set forth in claim 26, wherein said retention pockets of said links capture the fins of the attachment member of the wiper arm when said locking tabs move from said first position to said second position.

28. The wiper assembly as set forth in claim 17, wherein said strap is spaced longitudinally between said nose and said at least one locking tab.

29. The wiper assembly as set forth in claim 17, wherein said strap has a middle section and a pair of supports depending therefrom, said supports merging with said outside surfaces of said sidewalls.

30. The wiper assembly as set forth in claim 29, wherein said middle section of said strap is spaced vertically above said nose.

31. The wiper assembly as set forth in claim 17, wherein said adapter further includes a pair of shelves connecting said inside surfaces of said sidewalls to said rails and extending longitudinally for a predetermined longitudinal extent of said body, said shelves spaced vertically below said strap so as to receive the track of the attachment member of the wiper arm.

32. The wiper assembly as set forth in claim 17, wherein said nose includes an upper surface extending between and merging with said sidewalls and having a notch disposed therein, said notch adapted to receive at least a portion of the bent tab of the attachment member of the wiper arm when the attachment member is attached to said adapter.

* * * * *